Figure 1:
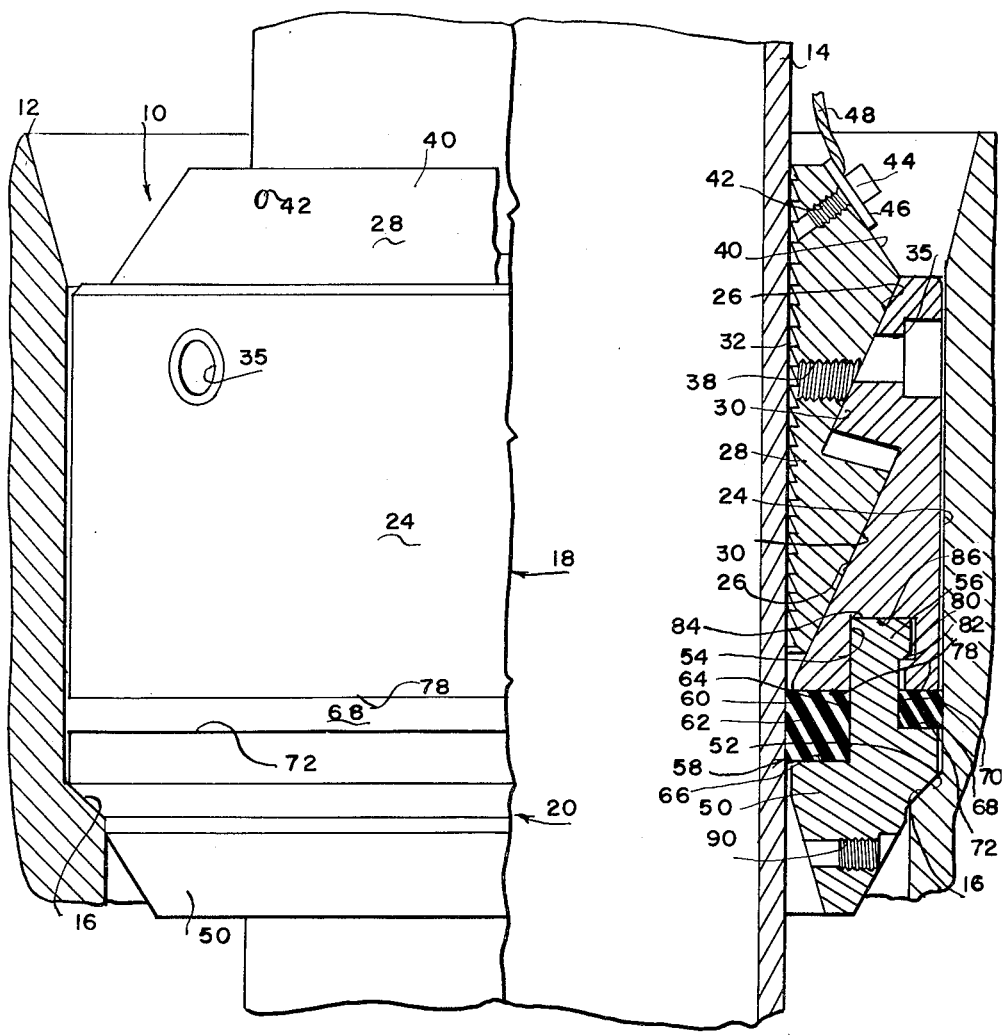

Aug. 28, 1962   J. D. WATTS ETAL   3,051,513
HANGER ASSEMBLY AND SEAL THEREFOR
Filed March 11, 1959   3 Sheets-Sheet 2

INVENTORS
JOHN D. WATTS
ELWOOD K. PIERCE

BY *Cushman, Darby & Cushman*
ATTORNEYS

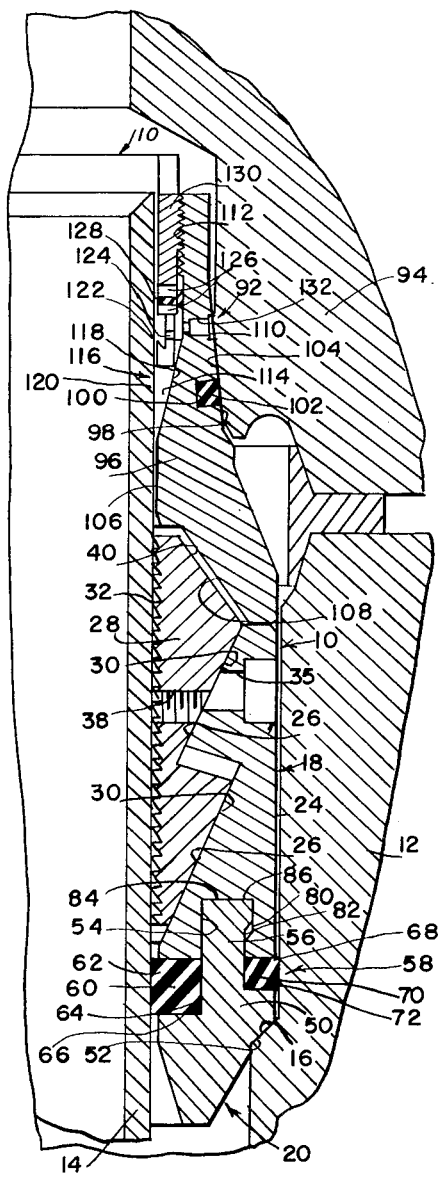

United States Patent Office
3,051,513
Patented Aug. 28, 1962

3,051,513
HANGER ASSEMBLY AND SEAL THEREFOR
John D. Watts and Elwood K. Pierce, Jr., Houston, Tex., assignors to Gray Tool Company, Houston, Tex., a corporation of Texas
Filed Mar. 11, 1959, Ser. No. 798,709
12 Claims. (Cl. 285—146)

The present invention relates to oil well completion equipment and more particularly to an improved hanger assembly and seal therefor.

The invention may be employed, for example, as a hanger for use in building safe oil wells by the methods described in U.S. Patents 2,117,444, issued May 17, 1938, and 2,082,413, issued June 1, 1937, to Mueller and Yancey. The description of applicable structure and steps in operation which appear in these patents is not repeated in detail herein, it being understood that they are referred to as showing equipment and methods which would be used with the present invention and to that extent they form a part of the present disclosure.

In the normal operation of the procedures described in the above patents, it is of advantage and convenience to the operator to be able to quickly and effectively mount the hanger on the pipe string or tubing between the ends thereof, that is, without the necessity of sliding the hanger assembly over the end of the tubing. This ability of the hanger assembly to be "wrapped around" the tubing is particularly advantageous when blow out conditions are presented in the completion of the well.

Accordingly, it is an object of the present invention to provide a hanger assembly of the type described embodying a plurality of arcuate, segmental members which can be wrapped around a pipe string and rotated relative to each other so as to provide a substantially radially rigid hanger assembly.

Still another object of the present invention is the provision of a wrap around hanger assembly of the type described embodying upper and lower segmental members which cooperate together to define a tubing support bowl and a casing head engaging ring respectively, the segmental members forming the bowl and ring being interconnected in pairs by an improved construction providing limited vertical movement between the ring and bowl and relative rotational movement therebetween.

Still another object of the present invention is the provision of a wrap around hanger assembly of the type described having improved segmental sealing means for providing a seal between the exterior of a pipe string or tubing supported by the hanger and the interior of a casing head upon which the hanger is seated.

Still another object of the present invention is the provision of a wrap around hanger assembly of the type described having improved seal means operable to expand into sealing engagement in response to the landing of the hanger on the casing head seat.

Still another object of the present invention is the provision of a hanger assembly of the type described having an improved upper hanger bushing unit for sealingly engaging the next casing head and for providing a permanent seal with the exterior of the pipe string or tubing supported by the hanger assembly.

Still another object of the present invention is the provision of an improved sealing element particularly applicable for effecting a seal between a hanger assembly and the exterior of a pipe string or tubing supported thereby.

Still another object of the present invention is the provision of a novel method of manufacturing such a seal.

These and other objects of the present invention will become more apparent during the course of the following detailed description and appended claims.

The invention may best be understood with reference to the accompanying drawings wherein illustrative embodiments are shown.

Figure 3:
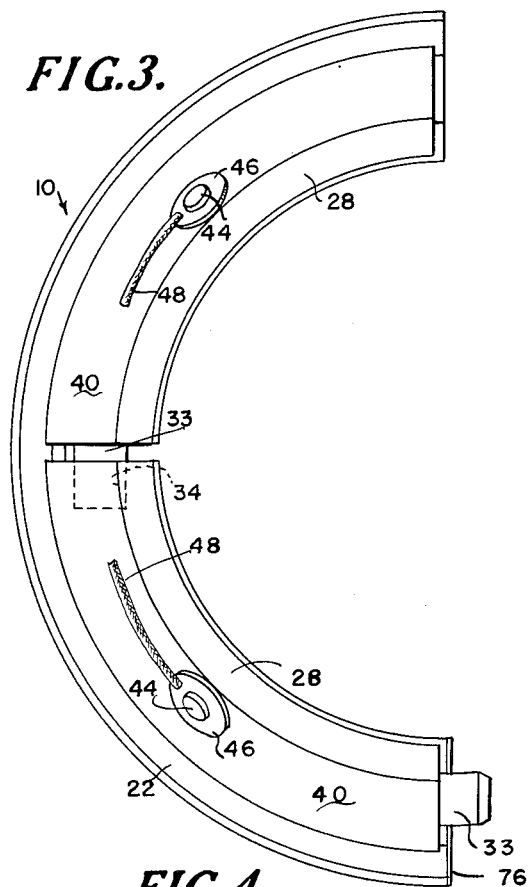
Figure 2:
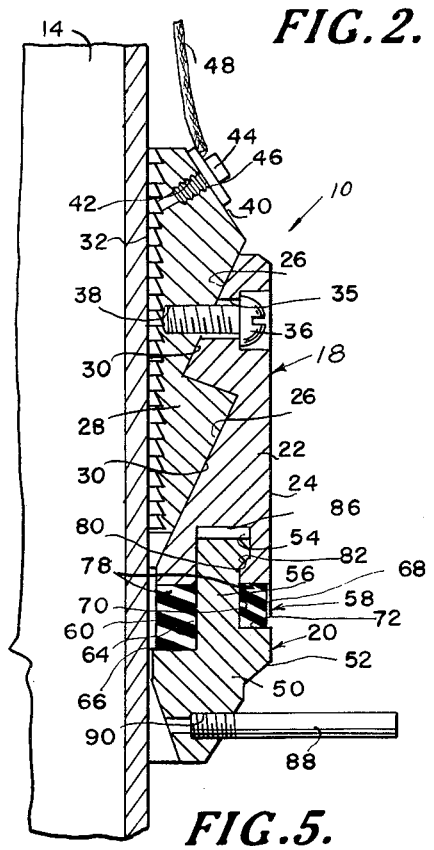
Figure 4:
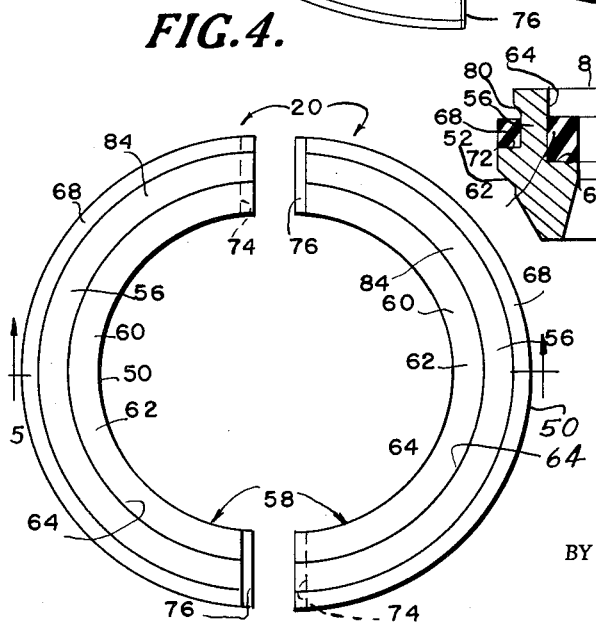
Figure 5:
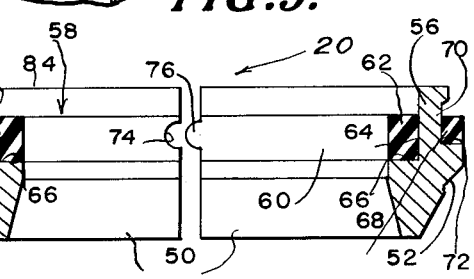

In the drawings:
FIGURE 1 is a fragmentary elevational view, partly in section, of the lower bushing unit of a hanger assembly embodying the principles of the present invention, the unit being shown landed on a casing head and supporting a pipe string therein;
FIGURE 2 is a fragmentary cross-sectional view of the lower bushing unit of the hanger assembly showing the parts mounted on a pipe string prior to the landing in the casing head;
FIGURE 3 is a top plan view of one-half of the lower bushing unit of the hanger assembly illustrated in FIGURE 1;
FIGURE 4 is a top plan view of the lower segmental members of the bushing unit which are cooperable together to form the compression ring or lower bushing section of the hanger assembly, the segmental members being shown in spaced relation with respect to each other;
FIGURE 5 is a cross-sectional view taken along the line 5—5 of FIGURE 4;
FIGURE 6 is a fragmentary vertical sectional view of the entire hanger assembly showing the same mounted in operative position between two successive casing heads; and
FIGURE 7 is a fragmentary, cross-sectional view similar to FIGURE 6 illustrating a modified form of the upper bushing unit of the hanger assembly and the manner in which the same is permanently sealed with respect to the exterior of the pipe string.

Referring now more particularly to the drawings, there is shown in FIGURE 1 a lower hanger bushing unit, generally indicated at 10, which forms a part of the hanger assembly of the present invention. In FIGURE 1 the lower bushing unit of the hanger assembly is shown landed in a casing head 12 and supporting a pipe string or tubing 14 in a manner well-known in the art.

The lower bushing unit 10 is of the wrap around type which can be applied to the pipe string between the ends thereof, that is, the lower bushing unit does not need to be installed in the pipe string by axial movement over one end thereof. To this end, the lower bushing unit 10 is constructed of a plurality of segmental members which can be assembled around a pipe string between the ends thereof and then moved into an operative position so as to form a substantially radially rigid hanger body capable of supporting a pipe string 14 through a central bore therein and of being landed in the casing head 12, as shown in FIGURE 1. The casing head 12 has the usual upwardly facing frusto-conical seat 16 formed therein upon which the lower bushing unit of the hanger assembly is seated.

As best shown in FIGURES 2 and 3, the lower bushing unit 10 of the hanger assembly is made up of upper and lower bushing sections, generally indicated at 18 and 20 respectively. The upper bushing section 18 is formed by a pair of arcuate segmental members 22 of semi-circular configuration, which members, when disposed in cooperating relation with respect to each other, form a slip bowl. It will be understood, that while the upper bushing section 18 is illustrated as being made up of two semi-cylindrical segmental members, more than two such members may be provided and it is not essential that they be of equal arcuate extent. The segmental members in their slip bowl forming cooperating position provide an exterior cylindrical surface 24 which is arranged to closely fit within the upper bore of the casing head 12.

The upper bushing section 18 has means provided thereon for engaging and supporting the pipe string and, to this end, the interior surface of the segmental members 22 are provided with a series of vertically spaced downwardly and inwardly inclined frusto-conical surfaces 26.

Disposed within the slip bowl formed by the segmental members 22 is a plurality of segmental slips 28 each having a series of vertically spaced exterior frusto-conical wedging surfaces 30 engageable with the surfaces 26. Each segmental slip also includes an interior serrated surface 32 of generally arcuate configuration for operative engagement with the exterior surface of the pipe string to support the latter.

As shown in FIGURE 3, there are four segmental slips 28 provided, each segmental member 22 having a pair of such slips associated therewith. It will be noted that the engagement of the wedging surfaces 30 of the slips with the wedging surfaces 26 of the segmental members serves to guide the slips for movement between an upper retracted position and a lower extended position. It will also be seen that in their raised position the longitudinal edges of the slips are disposed in spaced relation. In order to maintain the proper relation between the slips, a pin 33 extends tangentially outwardly from one longitudinal edge thereof and the opposite longitudinal edge has a tangentially extending bore 34 formed therein for receiving the pin 33 of the adjacent slip.

In order to maintain the segmental slips 28 in engagement with the segmental members 22, each segmental member 22 has formed therein a radially extending opening 35 which is arranged to receive a securing bolt 36. As shown in FIGURE 2, each segmental slip 28 has formed therein a threaded aperture 38 for receiving an associated bolt 36, the bolt serving to detachably secure the slips in a raised or outward position of wedged engagement.

In order to provide the operator with a convenient means for handling the segmental portions of the lower bushing unit 10, the upper exterior portions of the slips are formed with segmental frusto-conical surfaces 40 having inclined threaded apertures 42 extending therethrough. Bolts 44 are threaded within the apertures 42 to secure washers 46 in engagement with the surface 40. An extent of wire rope or the like 48 is welded or otherwise rigidly secured to the washers 46 and provides the means for handling each segment of the lower bushing unit 10.

The lower bushing section 20 is made up of a plurality of segmental members 50 which preferably correspond in number and arcuate extent to the segmental members 22. The segmental members 50, when positioned in cooperating relation, form a compression ring having a downwardly facing exterior frusto-conical surface 52 for engaging the seat 16 of the casing head.

As stated above, the segmental members 50 of the lower bushing section 20 preferably correspond in number and axial extent to the segmental members 22 of the upper bushing section. In this way, the lower bushing unit 10 provides pairs of upper and lower segmental members 22 and 50, and each pair of members is interconnected for limited vertical movement and for arcuate movement with respect to each other. It will be noted that the segmental members, when disposed in cooperating relation, are all arcuate about a common axis and the relative movement afforded by the connection between each pair of members is about this common axis.

To this end, the lower portion of each segmental member 22 has formed therein an upwardly extending arcuate slot 54. As shown in FIGURES 1 and 2, the slot in each segmental member 22 is formed with a generally inverted L-shaped configuration to receive an arcuate tongue 56 extending upwardly from the associated lower segmental member 50, which tongue is of a corresponding generally inverted L-shaped configuration. While the inverted L-shaped configuration described above and illustrated in the drawings is preferred, it will be readily understood that other tongue and groove connections may be employed, if desired. Preferably, however, the tongue and groove connection should serve to connect each pair of upper and lower segmental members together and yet provide a limited amount of relative vertical movement therebetween.

The purpose of providing this relative vertical movement is to compress a sealing means, generally indicated at 58, between the upper and lower bushing sections 18 and 20, when they are landed on the casing head to effect a seal between the exterior of the pipe string supported thereby and the interior of the casing head upon which the lower bushing unit is landed.

As best shown in FIGURES 4 and 5, the sealing means 58 comprises a segmental sealing ring element 60 mounted on each lower segmental member 50 on opposite sides of the tongue 56. Each sealing ring element may be of any suitable material, preferably of the resilient type which is expandable radially in response to longitudinal or axial compression. As shown, each sealing ring element 60 includes an inner semi-cylindrical portion 62 of rectangular cross-sectional configuration having its exterior cylindrical surface disposed in engagement with an interior cylindrical surface 64 formed on the tongue 56, and its lower surface disposed in engagement with a transverse surface 66 extending inwardly from the lower end of the tongue 56 in a plane substantially perpendicular with the axis. Each segmental sealing element 60 also includes an outer semi-cylindrical portion 68 which is also of rectangular cross-sectional configuration and has its inner cylindrical surface disposed in engagement with an exterior cylindrical surface 70 formed by the tongue of the associated segmental member 50 and its lower surface disposed in engagement with a transverse surface 72 extending outwardly from the tongue in a plane substantially perpendicular to the axis of the segmental members at a position spaced above the surface 66.

As shown in FIGURE 5, the inner and outer semi-cylindrical portions of each segmental sealing element 60 is co-extensive with the associated segmental member 50 and one longitudinal edge of the semi-cylindrical portions, as well as the associated longitudinal edge of the tongue of the segmental members, is formed with a semi-cylindrical groove or notch, as indicated at 74. The opposite longitudinal edges of the inner and outer semi-cylindrical portions of each segmental sealing element are interconnected by an integral tongue portion 76 arranged to engage within the groove 74 of the adjacent segment of the lower bushing section.

It will be seen that each pair of upper and lower members is interconnected by inserting the arcuate tongue 56 within the arcuate groove 54 and effecting a relative arcuate movement between two members. In an arcuately aligned position of initial assembly, as shown in FIGURE 2, lower transverse surfaces 78 on each upper segmental member 22 will engage the upper surface of the associated segmental sealing element 60. It will also be noted that the arcuate tongue 56 of inverted L-shaped cross-sectional configuration provides a downwardly facing arcuate surface 80 which engages a corresponding upwardly facing arcuate surface 82 provided by the arcuate groove 54 of inverted L-shaped configuration. In addition, the tongue 56 provides an upper surface 84 which is disposed in spaced relation to a corresponding upper interior surface 86 provided in the groove 54.

Prior to use of the present hanger assembly, the lower bushing unit 10 is assembled, as indicated above, with each pair of segmental members in substantially arcuate alignment. Moreover, the segmental slips 28 are fixed in a raised position within the associated segmental member 22 by engagement of the securing bolts 36 within the threaded apertures 38 thereof. Of course, the bolts 44 are engaged within the threaded openings 42 to fasten the wire securing washers 46 thereto. In the embodiment shown, only two pairs of segmental members are employed to form the entire lower bushing section. When it is disposed to utilize the hanger assembly, the pairs of segmental members are placed on opposite sides of the pipe string or otherwise wrapped around the same, by gripping wires 48, and the pins 33 extending from the slips are engaged within the associated bores 34. When the pairs of segmental members have thus been disposed in cooperating relation about the pipe string it will be noted that they are all arcuate about a common axis which is concentric with the axis of the pipe string. Thus, by effecting a relative arcuate movement about this axis of the upper and lower segmental members so that the arcuate tongue of each lower segmental member 22 extends within the arcuate slot of both upper segmental members 50, a substantially radially rigid hanger body is formed. To aid in effecting this rotary or arcuate movement, each lower segmental member 50 is provided with a handle 88 (see FIGURE 2) which may be in the form of a pipe section or the like having one end detachably threaded within the associated segmental member 50, as indicated at 90, and its opposite end extending outwardly radially therefrom.

In this way the lower bushing unit 10 of the present hanger assembly is quickly and easily wrapped around the hanger and moved into a position forming a substantially radially rigid hanger body. Prior to landing the hanger the securing bolts 36 are removed which permits the slips to move downwardly and inwardly until the serrated arcuate surfaces 32 contact and engage the exterior surface of the pipe string. Of course, also before landing the lower bushing unit 10, the handles 88 are removed from the lower section 20.

Referring now more particularly to FIGURE 1, it will be noted that when the lower hanger bushing unit 10 is landed within the casing head 12 the exterior frusto-conical seat 52 of the lower section will engage the interior frusto-conical seat 16 of the casing head. The weight of the pipe string 14, supported by the upper bushing section 18 through the engagement of the slips therewith, causes the upper section 18 to move downwardly with respect to the lower section 20, thus compressing the segmental sealing elements 60 therebetween. It will be noted that the inner semi-cylindrical portions of the sealing elements are confined exteriorly by the surfaces 78, 64 and 66, so that they will expand radially inwardly under compression as a result of the relative vertical movement into sealing engagement with the exterior surface of the pipe string 14. In a like manner, the interior of the outer semi-circular portions of the segmental sealing elements are confined by the surfaces 78, 70 and 72 so that they are expanded radially outwardly under compression as a result of the relative vertical movement into sealing engagement with the interior of the casing head. The amount of relative vertical movement between the upper section and lower section, and hence the compression of the segmental sealing elements, is limited by the engagement of the upper tongue surface 84 with the upper groove surface 86. In this way, the sealing means 58 is adapted to form a seal in response to the landing of the lower inner bushing unit within the casing head. The seal provided by the sealing means 58 is sufficient as a temporary seal or in some instances as a permanent seal, however where excessive pressure conditions must be handled over an extended period of time it is preferable to provide an additional permanent seal.

Referring now more particularly to FIGURE 6, the hanger assembly of the present invention also includes an upper bushing unit, generally indicated at 92, which is arranged to cooperate with the lower bushing unit to provide a permanent seal between the hanger assembly and the exterior of the pipe string being supported thereby and which seats within a second casing head 94, of smaller diameter, mounted on the casing head 12.

The upper bushing unit comprises an annular member 96 forming a bushing arranged to be mounted on the lower bushing unit 10. The annular member is provided with an intermediate exterior frusto-conical seating surface 98 having an annular groove 100 formed therein for receiving a sealing element 102. The annular seating surface 98 and sealing element 102 are arranged to engage a downwardly facing frusto-conical seating surface 104 formed in the lower portion of the casing head 94 as is well-known in the art.

The annular member 96 includes a central bore 106 having a frusto-conical counterbore 108 formed in its lower end to receive the frusto-conical surfaces 40 of the slips 28. The upper end of the bore 106 has a counterbore 110 formed therein, the upper end of which is threaded as indicated at 112, and the lower end of which connects with the bore 106 to provide an upwardly facing frusto-conical sealing surface 114.

Mounted within the counterbore 110 of the annular member 96 for sealing engagement with the frusto-conical surface 114 and with the exterior surface of the pipe string 14 supported by the hanger assembly, is a sealing ring element, generally indicated at 116. The sealing ring element is generally wedge shaped in cross-sectional configuration and includes an exterior frusto-conical surface 118 and an interior cylindrical surface 120.

The sealing element 116 is made by weaving wire of a metallic material such as stainless steel into a cloth-like tube or sleeve. The sleeve is then coated with an inert plastic material, such as polymerized tetrafluoroethylene (Teflon) or preliminarized chlorotrifluoroethylene (Kel-F), preferably the former. The coated sleeve is then rolled up upon itself about its axis (i.e. in much the same manner that a person would roll down his socks) and then the rolled up and coated sleeve is placed in a die corresponding in shape to that illustrated in the drawings and molded under heat and pressure into a ring of wedge-shaped cross-sectional configuration, such as illustrated in the drawings. In this way, the sealing element has a relatively hard body with a softer, relatively thin inert material on the surface thereof. This enables the sealing ring to produce a wedging action and yet have a surface soft enough to conform to the irregularities of the pipe string.

The sealing element 116 is wedged into engagement between the exterior surface of the pipe string and the frusto-conical surface 114 by a compression ring 122 having a plurality of circumferentially spaced openings 124 extending radially therethrough. Mounted above the compression ring 122 is a pair of junk rings 126 having a compressible sealing material 128 secured therebetween. Finally, an exteriorly threaded sleeve 130 is engaged within the threaded end 112 of the counterbore 110 and operates, in response to inward threaded movement, to compress the ring element 120 into sealing engagement between the exterior surface of the pipe string and the frusto-conical surface 114.

It will be understood that after the pipe string is run into the hole the lower bushing unit 10 of the hanger assembly is placed around the pipe string in the manner indicated above and dropped down onto the seat of the casing head 12 after which the slips 28 receive the load of the pipe string. After the control equipment normally utilized in connection with the casing head in the manner described in the aforesaid patents has been removed, the upper bushing section 92 is placed over the top of the pipe string and lowered to rest on the lower bushing unit 10 which positions it at the proper elevation with respect to the heads. The threaded sleeve 130 is then tightened within the counterbore 110 which moves the permanent sealing element 120 into sealing engagement with the exterior of the pipe string 14 and the frusto-conical surface 114 and also compresses the sealing material 128 between the two junk rings 126, thus forming a temporary seal between these two rings.

In accordance with usual practice, the annular member 96 has formed therein a radially extending port or opening 132 which is axially positioned between the permanent seal 116 and the temporary seal 128, for receiving test pressure equipment. Test pressure is then injected through the opening 132 into the space between sealing material 128 and the sealing element 116 which moves the latter into tighter wedged engagement with the exterior of the pipe string. The test pressure is then released and the sealing member is re-tightened to take up the resulting slack. The casing head 94 is then installed on the casing head 12 with the seat 104 thereof engaging the seat 98 of the upper bushing member. It will be understood that any suitable means may be provided for effecting the securement of the upper casing head 94 to the lower casing head 12, a preferred embodiment of such securing means being shown in Watts et al., 2,766,-829 issued October 16, 1956.

It will be understood that while the construction illustrated in FIGURE 6 is greatly preferred, other permanent sealing arrangements may be employed if desired. For example, in FIGURE 7 there is shown an upper bushing unit, generally indicated at 134, of a modified form. The upper bushing unit 134 is formed of an annular member 136 having a centrally located exterior frusto-conical seating surface 138 provided with a sealing element 140 for engaging the frusto-conical seat 104 of the casing head 94. The annular member includes a central bore 142 having a frusto-conical counterbore 144, corresponding to the counterbore 108 previously described formed in the lower end thereof.

Formed in the bore 142 above the counterbore 144 is an annular groove 146 arranged to receive a temporary sealing ring 148. The upper end of the bore 142 is relieved, as indicated at 150, to provide a weld receiving surface. The annular member is sealed with respect to the exterior pipe string 14 by weld material, such as indicated at 152, and the effectiveness of this seal is tested by applying test pressure to the bore 142 between the weld and the temporary seal 148 through an axial port 154. This manner of effecting the permanent seal is similar to that disclosed in Watts et al. Patent 2,754,134, issued July 10, 1956.

It can thus be seen that there has been provided a hanger assembly which obtains all of the advantages of wrap around type hangers previously known. The present construction is economical to manufacture and provides an effective means for holding the pairs of upper and lower segmental members of the lower bushing unit together and for efficiently securing all of the segmental members together so that they provide a substantially radially rigid structure of considerable strength.

The compressible segmental sealing elements 60, due to their arrangement on opposite sides of the tongue of the lower hanger bushing section, maintain a constant cross-sectional area for a given size pipe and/or bowl. That is, the width of the tongue of the compression ring between the seals can be varied to maintain the width of the seal within desired limits. For example, the width of a seal around a five-inch pipe can be the same whether it is hung from a ten-inch or a twelve-inch bowl. This arrangement eliminates the necessity to compress a compression seal whose width is from the exterior of the pipe string to the interior of the casing head. With the present arrangement, an increase in unit pressure is obtained over that indicated above so that an effective seal is obtained even if a light casing load is suspended. Overloading of the seal when long strings are hung is prevented by engagement of the surfaces 84 and 86.

Tests of the present hanger assembly indicate that the same can suspend more weight than any known prior art hanger assembly of comparable length commercially available. This extra load-bearing capacity is due primarily to two reasons. First, the radial load against the pipe string and consequently the radial load against the head is reduced by the large angle made possible by the step cut slip. Second, the outward radial force against the head is distributed over a long length.

The compression sealing means 58 of the lower bushing unit 10 may be used as a permanent seal in low pressure wells if so desired. In most cases, however, it is preferable to utilize a permanent seal such as illustrated in FIGURES 6 and 7.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

We claim:

1. A hanger assembly for supporting an inner pipe string from the interior seat of a casing head comprising a plurality of arcuate segmental upper and lower members disposable together in cooperating relation with respect to each other to form a substantially radially rigid annular body having an exterior seat for engaging the interior seat of a casing head, a bore for receiving a pipe string, and means for supporting a pipe string received in said bore, said members in cooperating relation being arcuate about a common axis, said upper and lower members having axially extending first and second holding means, respectively, adapted to engage one another upon relative arcuate movement about said common axis from a first position of cooperating relation wherein said members are movable out of and into cooperating relation to permit the same to be moved into surrounding relation to a pipe string between the ends thereof and a second position of cooperating relation wherein said members are fixedly retained by said holding means in cooperating relation to form said substantially radially rigid annular body.

2. A hanger assembly as defined in claim 1 wherein said pipe string supporting means comprises a plurality of slips carried by certain of said members in circumferentially spaced relation within said pipe string receiving bore for inwardly and downwardly wedged movement with respect thereto.

3. A hanger assembly as defined in claim 2 wherein said members include seal means separate from said exterior seat operable when said members are in their second position of cooperating relation to form an annular seal between the exterior of a pipe string received in said bore and the interior of a casing head supporting the hanger assembly.

4. A hanger assembly for supporting an inner pipe string from the interior seat of a casing head comprising a plurality of arcuate segmental upper and lower members disposable together in cooperating relation with respect to each other to form a substantially radially rigid annular body having an exterior seat for engaging the interior seat of a casing head, a bore for receiving a pipe string, and means for supporting a pipe string received in said bore, said members in cooperating relation having seal means forming an annular seal between the exterior of a pipe string received in said bore and the interior of a casing head supporting the hanger assembly, said members in cooperating relation being arcuate about a common axis, said upper and lower members having axially extending first and second holding means, respectively, adapted to engage one another upon relative arcuate movement about said common axis from a first position of cooperating relation wherein said members are movable out of and into cooperating relation to permit the same to be moved into surrounding relation to a pipe string between the ends thereof and a second position of cooperating relation wherein said members are fixedly retained by said means in cooperating relation to form said substantially radially rigid annular body.

5. A hanger assembly for supporting an inner pipe string from the interior seat of a casing head comprising a plurality of pairs of upper and lower arcuate segmental members disposable together in cooperating relation with respect to each other to form a substantially radially rigid annular body having an exterior seat for engaging the interior seat of a casing head, a bore for receiving a pipe string, and means for supporting a pipe string received in said bore, said members in cooperating relation being arcuate about a common axis, each pair of upper and lower segmental members having a tongue and groove connection therebetween, each of said connections being arcuate about said common axis to permit relative arcuate movement between said upper and lower members between a separable position wherein each pair of members is disposed in arcuate alignment and a rigid body forming position wherein each upper member is disposed in arcuate overlapping relation with respect to two adjacent lower members.

6. A hanger assembly as defined in claim 5 wherein said tongue and groove connections include surfaces mounting each pair of upper and lower members for limited longitudinal movement with respect to each other in both directions.

7. A hanger assembly as defined in claim 5 wherein each pair of upper and lower members has an arcuate sealing element therebetween on opposite sides of the associated tongue and groove connection, said sealing elements being radially expansible into sealing engagement with the exterior of a pipe string supported in said bore and the interior of a casing head upon which said body is seated in response to compression thereof resulting from relative vertical movement of said upper and lower members toward each other.

8. A hanger assembly for supporting an inner pipe string from the interior seat of a casing head comprising a plurality of lower arcuate segmental members disposable together to form a ring having a central pipe string receiving bore therein and an exterior seat for engaging the interior seat of a casing head, a plurality of corresponding upper arcuate segmental members disposable together to form a slip bowl having a central opening concentric with said bore and a plurality of slips disposed in circumferentially spaced relation about said opening for wedged movement downwardly and inwardly with respect thereto into engagement with the exterior surface of a pipe string received in said bore to support the same therein, each pair of corresponding upper and lower segmental members having a tongue and groove connection therebetween, each connection being arcuate about the axis of said bore to permit relative arcuate movement between said upper and lower members between a separable position wherein each pair of members is disposed in arcuate alignment and a substantially radially rigid body forming position wherein each upper member is disposed in arcuate overlapping relation with respect to two adjacent lower members.

9. Oil well completion equipment comprising a casing head having an interior seat, a segmental ring having an exterior seat engaging the interior seat of said casing head, a correspondingly segmented slip bowl, tongue and groove means between said ring and said bowl mounting the same together in segmental overlapping relation for relative rotation and for limited vertical movement with respect to each other, inner and outer segmental annular sealing elements between said ring and said bowl on opposite sides of said tongue and groove connection, and slips mounted in said slip bowl for downwardly and inwardly wedged movement into engagement with a pipe string to support the same, the weight of the pipe string supported by said slips effecting vertical movement of said bowl with respect to said ring to compress the inner sealing element into sealing engagement with the exterior of the pipe string and the outer sealing element into sealing engagement with the interior of the casing head.

10. Oil well completion equipment comprising a casing head having an interior seat, a segmental ring having an exterior seat engaging the interior seat of said casing head, a correspondingly segmented slip bowl, tongue and groove means between said ring and said bowl mounting the same together in segmental overlapping relation for relative rotation and for limited vertical movement with respect to each other, inner and outer segmental annular sealing elements between said ring and said bowl on opposite sides of said tongue and groove connection, slips mounted in said slip bowl for downwardly and inwardly wedged movement into engagement with a pipe string to support the same, the weight of the pipe string supported by said slips effecting vertical movement of said bowl with respect to said ring to compress the inner sealing element into sealing engagement with the exterior of the pipe string and the outer sealing element into sealing engagement with the interior of the casing head, a second casing head secured to said first casing head thereabove, said second casing head having an interior downwardly facing frusto-conical seat, a bushing mounted on said bowl and having an exterior upwardly facing frusto-conical seat engaging said second casing head seat, and permanent seal means between said bushing and the pipe string supported by said slips.

11. A hanger assembly for supporting an inner pipe string from the interior seat of a casing head comprising a plurality of pairs of upper and lower arcuate segmental members disposable together in cooperating relation with respect to each other to form a substantially radially rigid annular body having an exterior seat for engaging the interior seat of a casing head, a bore for receiving a pipe string, and means for supporting a pipe string received in said bore, said members in cooperating relation being arcuate about a common axis, each pair of upper and lower segmental members having a tongue and groove connection therebetween, each of said connections being arcuate about said common axis to permit relative arcuate movement between said upper and lower members between a separable position wherein each pair of members is disposed in arcuate alignment and a rigid body forming position wherein each upper member is disposed in arcuate overlapping relation with respect to two adjacent lower members, an arcuate sealing element between each pair of upper and lower members on opposite sides of the associated tongue and groove connection, said sealing elements being circumferentially expansible into cooperating sealing engagement with respect to each other and radially expansible into sealing engagement with the exterior of a pipe string supported in said bore in the interior of a casing head on which said body is seated in response to compression thereof resulting from relative vertical movement of said upper and lower members toward each other.

12. A hanger assembly as defined in claim 5 wherein the sealing elements of adjacent pairs of upper and lower members include tongue and groove connections which are circumferentially expansible into cooperating sealing engagement.

References Cited in the file of this patent

UNITED STATES PATENTS

| | | |
|---|---|---|
| 1,863,799 | Loetscher | June 21, 1932 |
| 2,082,413 | Mueller | June 1, 1937 |
| 2,117,444 | Mueller | May 17, 1938 |
| 2,210,833 | Clough | Aug. 6, 1940 |
| 2,313,169 | Penick | Mar. 9, 1943 |
| 2,318,589 | Barnette | May 11, 1943 |
| 2,456,081 | Penick | Dec. 14, 1948 |
| 2,481,035 | Penick | Sept. 6, 1949 |
| 2,481,732 | Edwards | Sept. 13, 1949 |
| 2,493,556 | Stone | Jan. 3, 1950 |
| 2,553,838 | Allen | May 22, 1951 |
| 2,712,455 | Neilon | July 5, 1955 |
| 2,752,177 | Stevenson | June 26, 1956 |
| 2,754,134 | Watts | July 10, 1956 |